Dec. 17, 1940.  L. E. W. MONTROSE-OSTER  2,225,075
CONJUGATE SUSPENSION FOR TRUCKS
Filed Feb. 9, 1938
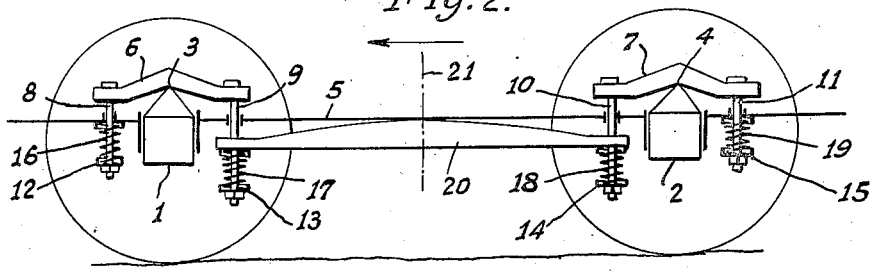
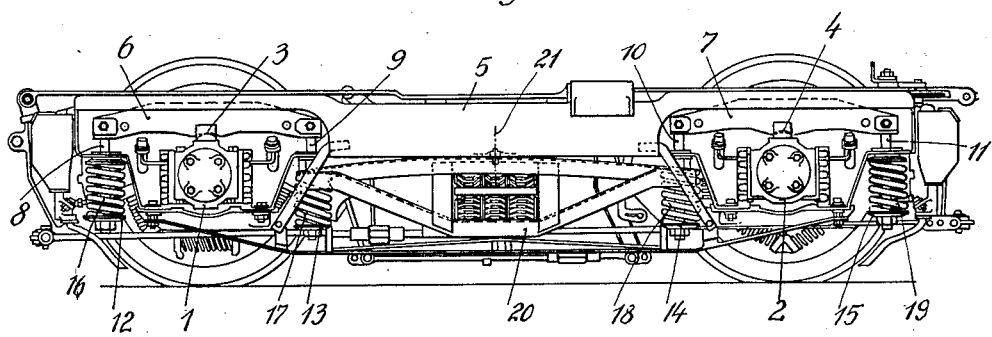
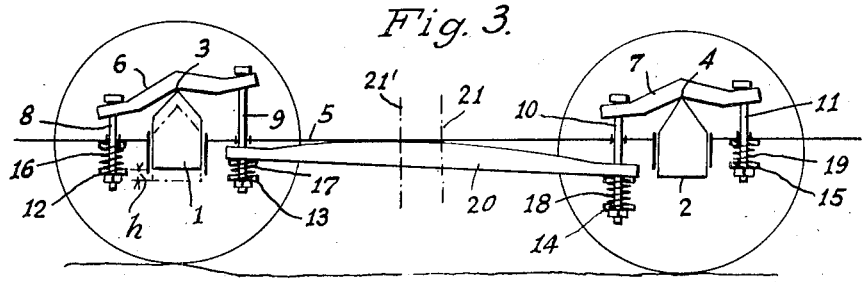
Inventor:
Louis Eugene Widolt Montrose-Oster
by C. P. Goepel.
Attorney.

Patented Dec. 17, 1940

2,225,075

UNITED STATES PATENT OFFICE 2,225,075

CONJUGATE SUSPENSION FOR TRUCKS

Louis Eugène Widolt Montrose-Oster, Carlsbad, Czechoslovakia, assignor of one-half to Pollopas Patents, Ltd., London, England Application February 9, 1938, Serial No. 189,671
In Germany February 12, 1937

5 Claims. (Cl. 105—194)

The present invention relates to conjugate suspensions for vehicles travelling at high speed.

The spring suspension according to the invention is mainly designed for bogies having four wheels of long road vehicles travelling at high speed, i. e. road vehicles having at least six wheels. Moreover, the novel spring suspension is also useable for other vehicles which are to be subjected to corresponding conditions. The change between the various kinds of vehicles is smooth.

In two-axle vehicles, conjugate suspensions, as is well-known, are not stable; stable spring-suspensions cannot be conjugated. In view of the steadily increasing speeds of travel, however, the need exists for a springing which is hard under load and soft under impact. Since these conditions are theoretically fulfilled by a conjugate suspension, the problem consists in obviating the chief disadvantage of a conjugate suspension, namely, its instability.

The present invention overcomes this disadvantage by the provision of a decreasingly conjugate suspension. With the invention, the conjugation, which is complete when the vehicle frame is exactly parallel to the plane of motion, decreases with an increasing angle of inclination between the vehicle frame and plane of motion. The restoring force necessary for restoring the initial condition arises correspondingly as the conjugation decreases as a function of the angle of inclination. For this purpose the axle-box springs provided at each side are conjugated independently on each other for instance by bearing against a rocking beam which is so mounted as to be capable of rolling or of performing a rocking movement.

The invention, therefore, consists in arranging at both sides of the vehicle a decreasingly conjugate suspension each limited to the corresponding side only. The spring suspensions provided at both sides, therefore, have, according to the invention no inter-connection whatsoever. The advantage obtained consists in this, that the construction of the spring suspension will be particularly simple and easily visible. Hereby a greater field of use is available for the decreasingly conjugate suspension, because according to the invention it is possible to use this spring suspension in connection with bogies having but four wheels also and yet to obtain a stable arrangement.

The new construction, moreover, avoids the disadvantages, known in the usual conjugate suspensions, of friction losses and thereby defective operation. This advantage is due to the fact, that no joints and bearings whatsoever are provided but only supports on knife-edges and rolling or rocking movements on a smooth surface.

In the accompanying drawing one construction of an auto-stable conjugate suspension is shown by way of example.

In this drawing:

Fig. 1 shows a general view of a conjugate suspension in connection with a two-axle bogie of a railway vehicle in which members forming no part of the invention are not provided with reference characters, and Figs. 2 and 3 are diagrammatic views to explain the mode of operation of the spring suspension.

Referring to the drawing, axle-boxes 1 and 2 are provided on their upper portions with knife-edges 3 and 4 and are guided in the vertical direction in a vehicle frame 5. Resting on the knife-edges 3 and 4 are suitably formed beams 6 and 7, with which spring bolts 8, 9, 10 and 11 engage also through knife-edges, which, for the sake of simplicity, are not illustrated. These spring bolts carry at their lower ends spring plates 12, 13, 14, 15, which in a well known manner serve as supporting surfaces for spiral springs 16, 17, 18, 19. The springs 16 and 19 in a well known manner bear with their upper ends against the vehicle frame 5. The springs 17 and 18 bear against a rocking beam 20, which in its upper side is shaped in the form of a curve symmetrically about its median line and can rock on a corresponding part of the vehicle frame 5 formed as a horizontal rocking surface.

The mode of operation as shown in Figs. 2 and 3 is as follows:

Let it be assumed that the state of equilibrium illustrated in the drawing in Fig. 2 is disturbed, for instance, by the left wheel striking an obstacle on movement in the direction of the arrow, and thereby being lifted by an amount $h$. At the first moment, the vehicle frame and the load supported thereon will not participate in this upward movement, whereby the individual parts of the suspension undergo the following change of condition (Fig. 3).

The axle-box 1 has lifted by $h$ with respect to the frame 5 of the vehicle. Thereby, with a normal suspension, the two springs 16 and 17 allotted to the axle-box 1 would also be compressed by $h$. With a completely conjugate suspension, on the other hand, this difference in height would be distributed in well known manner to all four springs, that is, to the suspensions of both axle-boxes, which causes the well known instability of the completely conjugate suspension. In the present case, however, the lift $h$ of the left wheel acts differently on the different springs, namely, in such a manner that the springs 16 and 17, which are foremost in the direction of travel, execute a smaller movement than the other springs 18 and 19. Therefore, the beam 6 at the knife-edge 3 will incline in the direction of travel, the large rocking beam 20 against the direction of travel and the beam 7 in the direction of travel.

However, at the moment when the rocking beam 20 leaves its position parallel to the road and inclines against the direction of travel, it ceases to be an equal-armed lever, since the point of contact between this lever or beam and the rocking surface on the frame 5 moves in the direction of travel for instance from 21 to 21'. Therefore, the left hand lever arm of the rocking beam 20 shortens while the right-hand lever arm correspondingly lengthens. Thereby, the spring stress of the springs 17, 18, which was previously the same, is altered in such a manner that the spring 18 must be more strongly compressed than the spring 17. The spring 18 in turn transmits a stronger pressure through the beam 7 to the spring 19, which consequently, in turn, exerts a stronger pressure on the vehicle frame 5, that is, tends to lift it. At the front axle, on the other hand, the stress of the springs 16 and 17 correspondingly decreases because that lever arm of the rocking beam 20 which is adjacent to them correspondingly shortens. At this moment the beam 7 will be more strongly inclined in the direction of travel than the beam 6.

Owing to this double action, the resulting unequal stress of both spring-suspensions is sufficient, even with minimum displacements of the rocking beam, to produce the necessary restoring force or torque.

Since the new arrangement works, particularly in the support of the rocking beam 20, without a bearing and therefore with minimum friction, shocks can, on the one hand, be absorbed at the shortest intervals of time with the flexibility of a conjugate suspension, while, on the other hand, the restoring force acts likewise without losses.

Where the drawing illustrates a girder-like rigid rocking beam, this is only a constructional example. The rocking beam may likewise have, for instance, the form of a lattice-girder, and may consist wholly or partly of springs. It is immaterial, of course, whether the rocking beam or its support comprises the rocking curve.

What I claim is:

1. A conjugate suspension for trucks, having two axles and four wheels, comprising a frame, axle boxes guided vertically in said frame and each having a bearing top portion extending above said frame, rigid beam members disposed on each of said axle boxes and pivotally supported on said bearing portions, and above said frame bolt members on each end of each beam member extending from the upper side of the frame to below the same, and forming inner and outer bolt members, a rigid rolling lever member below the frame and disposed between the pair of axle boxes and having a curved surface at its upper side in contact with the lower side of said frame, and having its ends in sliding connection with the adjacent bolt members, and coil spring members below the frame and supported on said bolt members, said inner bolt members at the adjacent ends of the beam members having the spring members disposed between the lower ends of the bolt members and the ends of the rolling lever member for holding the rolling lever member against the frame with balanced lever arms, and the bolt members on the outer ends of the beam members having the spring members disposed between the lower ends of the bolts and the frame.

2. In a self-stabilizing spring suspension of decreasing conjugation for car trucks having two spaced axles, a bogie frame, adjacent axle boxes one pair for each axle shiftably mounted in respect to said frame, a bearing support on each of said axle boxes and above said frame, a pair of rigid equalizing beams, each freely pivotally supported by one of said bearing supports above said frame, spring bolts, each connected at one end with each end of said equalizing beams and having the other end free, and said spring bolts forming pairs of inner and outer spring bolts, a coil spring for each of the pair of outer spring bolts, said pair of outer spring bolts and coil springs resiliently connecting the outer end of each equalizing beam with the frame, and a central rigid rolling beam disposed below said frame between the axle boxes and provided with a curved surface rollingly engaging said frame, the lever arms of said rolling beam being normally in balance, the combination of a pair of sliding connections, one at each end of the rolling beam and with the adjacent inner spring bolts, and a pair of coil springs, one for each of the inner spring bolts disposed between the free ends thereof and the ends of the rolling beam, whereby upon the pivotal movement of one equalizing beam over its bearing support, the rolling beam rolls upon the frame, and the other equalizing beam is displaced pivotally over its bearing support.

3. In a self-stabilizing spring suspension of decreasing conjugation for car trucks having a pair of spaced axles, a frame, a pair of longitudinally spaced axle boxes, one pair for each axle, vertically movable in respect to the frame, two pairs of rigid equalizers, each one pivotally supported upon one axle box and having their ends beyond their axle boxes resiliently connected with the frame, said equalizers being above the frame, and a rigid beam disposed between said axle boxes having a curved portion rollingly engaging said frame, and having its ends resiliently connected with the inner ends of the equalizers, said resilient connections pressing the curved portions against the frame, said rolling beam being below the frame, whereby upon the movement of one shaft vertically in respect to the other, the rolling beam is moved to an abnormal position, the resilient connection acting upon the other end of the rolling beam, tending to return the rolling beam to normal lever arm relationship.

4. In a self-stabilizing spring suspension of decreasing conjugation for car trucks having two spaced axles, a bogie frame, adjacent axle boxes one for each wheel shiftably mounted in respect to said frame, a bearing support on each of said axle boxes, rigid equalizing beams each one freely pivotally supported by one of said bearing supports, a coil spring for each end of said rigid equalizing beams, the outer coil springs resiliently connecting the outer ends of each equalizing beam with the frame, and a central rigid rolling beam disposed below said frame between the axle-boxes and provided with a curved surface rollingly engaging said frame, the lever arms of said rolling beam being resiliently connected to the inner ends of said equalizing beams by the inner coil springs.

5. In a self-stabilizing spring suspension of decreasing conjugation for car trucks having a pair of spaced axles, a frame, a pair of longitudinally spaced axle boxes on each side of the frame, one for each wheel, vertically movable in respect to the frame, two pairs of rigid equalizers, each one pivotally supported upon one axle box and having their ends beyond their axle boxes resiliently connected with the frame, and two rigid beams disposed each between two of said axle boxes having a curved portion rollingly engaging said frame, and having their ends resiliently connected with the inner ends of the equalizers, said resilient connections pressing the curved portions against the frame, said rolling beams being below the frame.

LOUIS EUGÈNE WIDOLT
MONTROSE-OSTER.